United States Patent [19]
Hall

[11] Patent Number: 5,428,700
[45] Date of Patent: Jun. 27, 1995

[54] LASER STABILIZATION

[75] Inventor: David B. Hall, La Crescenta, Calif.

[73] Assignee: Litton Systems, Inc., Beverly Hills, Calif.

[21] Appl. No.: 285,031

[22] Filed: Jul. 29, 1994

[51] Int. Cl.⁶ .............................................. H01S 3/04
[52] U.S. Cl. ...................................... 372/32; 372/31; 372/92; 372/20; 372/99; 372/23
[58] Field of Search ...................... 372/31, 32, 20, 23, 372/92, 99, 29; 356/350

[56] References Cited

U.S. PATENT DOCUMENTS

| | | | |
|---|---|---|---|
| 4,084,907 | 4/1978 | Pinard et al. | 356/106 |
| 4,173,442 | 11/1979 | Snyder | 356/346 |
| 4,299,490 | 11/1981 | Cahill et al. | 356/350 |
| 4,305,046 | 12/1981 | LeFloch et al. | 331/94.5 |
| 4,386,822 | 6/1983 | Bergh | 350/96.15 |
| 4,410,275 | 10/1983 | Shaw et al. | 356/350 |
| 4,493,528 | 1/1985 | Shaw et al. | 356/96.15 |
| 4,529,262 | 7/1985 | Ashkin et al. | 350/96.15 |
| 4,792,956 | 12/1988 | Kamin | 372/29 |
| 4,842,358 | 6/1989 | Hall | 350/96.15 |
| 4,887,900 | 12/1989 | Hall | 356/350 |
| 4,890,922 | 1/1990 | Wilson | 356/350 |
| 4,962,506 | 10/1990 | Rahn et al. | 372/94 |
| 5,167,444 | 12/1992 | Hall | 385/15 |
| 5,189,677 | 2/1993 | Yry | 372/23 |
| 5,212,711 | 5/1993 | Harvey et al. | 372/18 |

OTHER PUBLICATIONS

F. Tong, et al., "A Tunable Optical Filter for Wavelength Division Multiaccess Computer Network", *Electro-Optic Computer Peripherals Technology*, SPIE vol. 1816, (1992) pp. 113-119.

Primary Examiner—Leon Scott, Jr.
Attorney, Agent, or Firm—Klein & Szekeres

[57] ABSTRACT

The wavelength of a light source (e.g., laser) is stabilized by introducing a collimated beam from the source into a "wedged" etalon, i.e., an etalon having a Fabry-Perot cavity that continuously decreases in width along at least one axis that is normal to the axis of beam propagation. A pair of photodetectors at the output side of the etalon detect respective portions of the beam traversing different cavity widths. The respective output signals of the photodetectors are employed in a feedback loop, whereby the wavelength of the light source is controlled so as to minimize the amplitude difference between the two photodetector signals. The wavelength of the light source can be tuned by varying the ratio of the amplitudes of the photodetector output signals. The wedged etalon can also be used as a multichannel optical receiver, wherein a multi-wavelength collimated incident beam is introduced into the etalon. An array of photodetectors is disposed at the output side of the etalon, each located at a position corresponding to a different cavity width, so that each photodetector receives one of the component wavelengths of the incident beam.

20 Claims, 6 Drawing Sheets

INCIDENT BEAM PROFILES VS X(mm)

FIG. 3

FABRY PEROT TRANSMISSION VS X(mm)

FIG. 4

DIFFERENCE SIGNAL VS SCALE FACTOR
DEVIATION IN PPM

FIG. 5

DISCRIMINANT VS SCALE FACTOR DEVIATION IN PPM

DIFFERENCE SIGNAL VS SCALE
FACTOR DEVIATION IN PPM
X(1)=-1mm X(2)=1mm A=1.24

FIG. 10

LASER STABILIZATION

BACKGROUND OF THE INVENTION

This invention relates generally to the field of apparatus and methods for controlling the output of a light source having an optical output signal of tunable wavelength. More specifically, this invention relates to apparatus and methods for stabilizing and tuning the wavelength of the optical output signal from a coherent light source, such as a laser, used in a fiber optic system.

Wavelength stability in the optical output signal of the light source is necessary in many sensor systems and telecommunication systems using optical fibers, whether the light source is a superluminescent diode (SLD) or a laser (either a solid state laser or a semiconductor diode laser), especially when the scale factor of the system depends upon the source wavelength. For example, high precision, navigation grade fiber optic rotation sensors usually require a wavelength stability of about one part per million (ppm). A high degree of stabilization is also necessary in the lasers used in fiber optic telecommunication systems.

The wavelength of the light emitted from many types of lasers varies as a function of the operating temperature, and of the current applied to the energy source for excitation. Therefore, wavelength stabilization means must be employed to compensate for the effects of temperature and current variations, so that the suitable degree of stabilization is obtained.

A number of approaches to such light source stabilization have been developed, and are exemplified in several U.S. patents. For example, U.S. Pat. No. 4,842,358—Hall discloses optical signal source stabilization using an interferometer to form optical beams. The interferometer comprises a pair of birefringent crystals that are placed in the optical path of a light beam from an optical signal source. The crystals, having polarization-dependent refractive indices, produce a first beam having an intensity $I_o(1+\cos\phi)$ and a second beam having an intensity $I_o(1-\cos\phi)$. At the desired source frequency, the two intensities are equal. The difference between the two intensities is used to generate an error signal that is applied to servo the drive current of the source so as to produce an optical output signal from the source that minimizes the error signal. Alternatively, a fiber optic Mach-Zehnder interferometer may be used instead of the crystal interferometer.

U.S. Pat. No. 5,167,444—Hall discloses optical signal source stabilization, wherein the optical output signal from the source is stabilized by adjusting its frequency to maintain a selected optical transmission through a Fabry-Perot interferometer (or, more properly, an etalon). The interferometer or etalon has a "split level" gap; that is, the gap is split into two discrete portions of different widths. A photodetector associated with each portion generates an electric signal indicative of the beam intensity or power transmitted through that portion of the gap. At a desired wavelength of the optical signal incident on the interferometer, the transmission of light through the gap will be approximately equal in both gap portions, resulting in substantially equal amplitudes of the electrical signals from the two photodetectors. The two photodetector signals are fed into a differential amplifier, producing an error signal that is used, in a closed-loop servo, to control the drive current of the optical source so as to minimize the amplitude of the error signal. This minimum will occur at the desired wavelength.

While the above-described systems are capable of yielding satisfactory results, they exhibit some limitations. For example, manufacturing costs tend to be high: The system of U.S. Pat. No. 4,842,358, supra, requires relatively expensive components, such as birefringent crystals made to precisely controlled tolerances; while the fabrication of the "split level" gap of the system of U.S. Pat. No. 5,167,444, supra, is relatively difficult and and is not easily adapted to multiple light source applications. Moreover, the above-described systems lack a suitable tuning capability, which may be desired in some applications.

There has been an unsatisfied need, therefore, for a system of light source wavelength stabilization that is more easily and economically fabricated than the prior art systems, and that also has a convenient and accurate tuning capability.

SUMMARY OF THE INVENTION

Broadly, the present invention is a system for stabilizing, to a stability on the order of 0.1 ppm or better, the wavelength of an optical output signal from an optical source, comprising a Fabry-Perot interferometer or etalon with a fixed, slightly wedged gap, through which a pair of substantially parallel collimated optical beams from the source are propagated; photodetection means for generating an electrical signal in response to each of the beams propagated through the gap; and servo means for (a) generating an error signal in response to the difference in amplitudes of the two electrical signals generated by the photodetection means, and (b) feeding the error signal to the optical source to control the output wavelength so as to minimize the amplitude of the error signal. Advantageously, tuning means are also provided, whereby the ratio of the amplitudes of the photodetection means electrical signals can be adjustably varied, so as to vary adjustably the wavelength of the optical output signal that minimizes the amplitude of the error signal.

In a specific preferred embodiment, the optical output signal is fed, via an optical fiber, through a first optical coupler, by means of which a sampled portion of the signal is directed, through another optical fiber, through a second optical coupler that divides the sampled signal portion into two optical input beams of approximately equal amplitude. These two input beams are optically coupled to the input side of the etalon by means of a suitable collimating lens, such as a rod-shaped graded index lens ("GRIN lens").

The interferometer or etalon is of the Fabry-Perot type, comprising two flat mirror substrates optically contacted to opposite sides of an annular spacer. The etalon used in the present invention differs from the conventional Fabry-Perot design, in that the spacer is slightly wedged to provide a gap or cavity between the substrates that continuously decreases in width along at least one axis that is normal to the axis of propagation. In addition, the components of the etalon are fabricated of a glass or glass/ceramic composition having a very low coefficient of thermal expansion, thereby providing maximum thermal stability.

The width of the cavity at its center is an integral number of wavelengths of the incident beams at the nominal or desired wavelength of the optical output signal of the source. Thus, the Fabry-Perot transmission through the cavity is at its maximum at the cavity center at the nominal or desired wavelength. The collimated input beams are propagated through the cavity on opposite sides of the center, on the axis along which the gap width is a function of the linear distance from the center, at points at which the transmission is less than the maximum. Assuming input beams of equal power, the power of the beams exiting the cavity will be equal if they pass through points on either side of the cavity center of equal Fabry-Perot transmission. If the wavelength of the input beams changes, the point of maximum transmission (the resonant peak) shifts linearly from the center point. As a result of the linear shift in the cavity of the resonant peak, the input beams now pass through points of unequal transmission. Therefore, the exiting beams are now of unequal amplitude or power.

Each of the two beams exiting from the cavity is detected by a corresponding photodetector located adjacent the output side of the etalon. When the input beams are at the desired (nominal) wavelength, the photodetectors generate electrical output signals of equal amplitude. If the wavelength of the input beams shifts from the nominal value, the electrical output signals from the photodetectors become unequal in amplitude.

The electrical output signals from the two photodetectors are fed into a differencing circuit, such as a differential amplifier, which produces an error signal, the amplitude of which is proportional to the magnitude of the wavelength shift, and the sign of which is indicative of the direction of the shift. This error signal is then employed as a servo signal to control the optical source so as to minimize or null the error signal amplitude, which occurs when the optical output signal from the source is at the nominal wavelength.

A wavelength tuning capability is added by providing a variable gain amplifier between each photodetector and the differencing circuit. By varying the gain ratio of the two photodetectors, the wavelength required to minimize or null the error signal amplitude (i.e., the nominal wavelength) is adjustably varied, the direction of the wavelength shift being determined by whether the gain ratio is greater than or less than one.

There is a trade-off, however, between stability and tunability: Wavelength stabilization is proportional to cavity width, while the effective tuning range is inversely proportional to cavity width.

The above-described system is readily adaptable for stabilizing and/or tuning a plurality of optical sources, particularly lasers. Specifically, from one to a hundred or more laser sources can be accommodated, given a cavity of sufficient lateral dimensions. The sampled portion of the optical output signal of each laser source is coupled to the input side of the etalon via a pair of GRIN lenses, as described above. Also, as described above, for each laser source there are two photodetectors at the output side of the etalon, with each pair of photodetectors feeding their electrical output signals into a differencing circuit to produce an error signal that is used to servo the laser wavelength. Tuning of each laser can be accomplished by varying the gain applied to the photodetector output signals, as described above.

The wedged etalon employed in the present invention can be configured for use as a multi-channel optical receiver. In this configuration, a multi-frequency optical source is coupled, optimally via a plurality GRIN lenses, to the input side of the etalon. For each frequency desired to be received, a photodetector is placed adjacent the output side of the etalon, each photodetector being receptive to the input beam propagated through the cavity from one of the GRIN lenses. The number of frequencies capable of being received is thus equal to the number of GRIN lens/photodetector pairs. The wedged etalon, with the cavity having a width that continuously decreases along at least one axis that is normal to the axis of propagation of the input beams, acts as a frequency-selective optical filter, with a unique pass band for each GRIN lens/photodetector pair. Thus, the electrical output signal from each photodetector corresponds to a single selected frequency present in the multi-channel source beam.

As will be more readily appreciated from the detailed description that follows, the present invention offers a number of advantages not previously achieved in the prior art. For example, the present invention offers both wavelength stabilization and tuning, with the capability of having either function optimized (by selecting the proper cavity dimensions and configuration). Moreover, multiple optical sources (particularly lasers) can be stabilized and/or tuned with a single etalon. In addition, the multiple source configuration can be readily adapted for use as a multi-channel optical receiver. All of these functions can be performed with an apparatus that employs off-the-shelf components, without the need for expensive fabrication techniques.

DETAILED DESCRIPTION OF THE INVENTION

Figure 1:
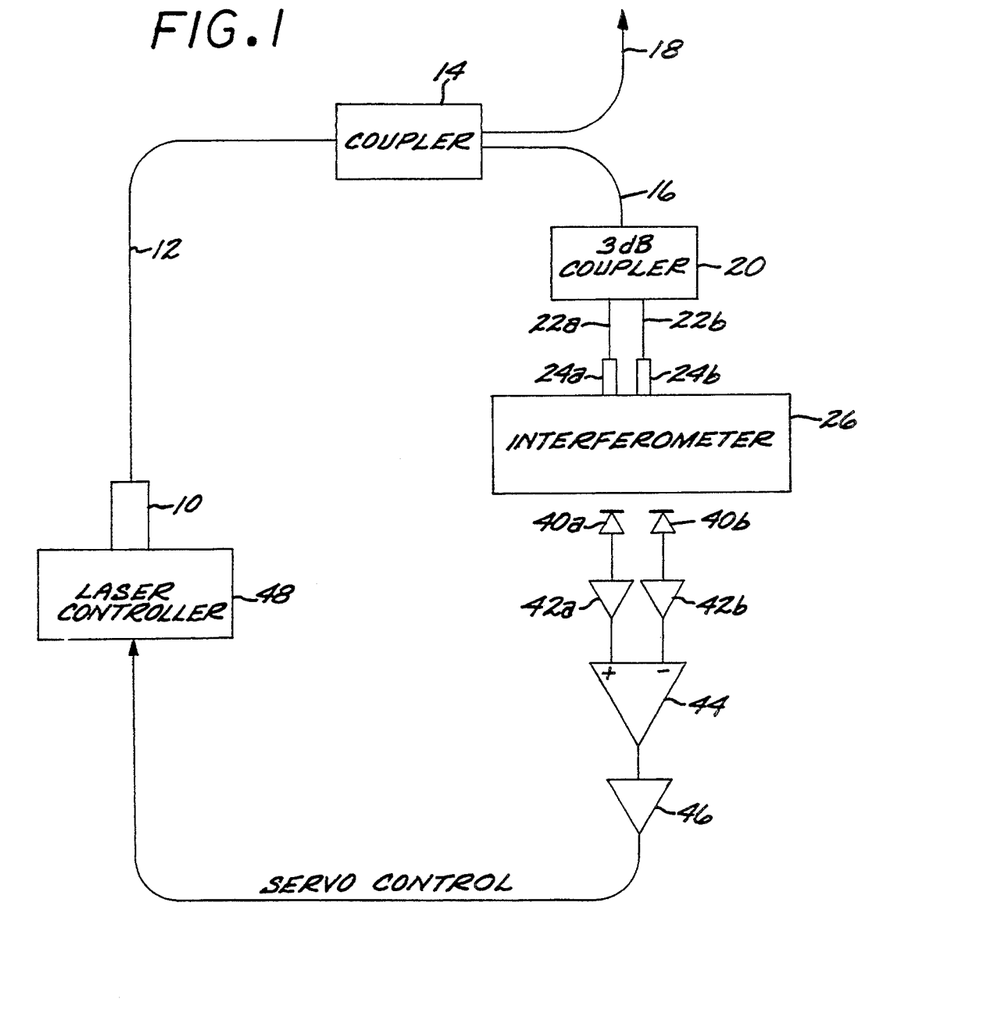
FIG. 1 is schematic diagram of a system for laser stabilization and tuning, in accordance with a preferred embodiment of the present invention.

FIG. 1 illustrates a system for stabilizing and tuning the optical output of a light source 10, in accordance with a preferred embodiment of the present invention. The light source 10 in most applications of interest will be a semiconductor diode laser or a solid state laser; for convenience in this description, it will be referred to as a laser. In other applications, however, the light source 10 may be a superluminescent diode or the like.

The optical output signal from the laser 10 is conducted, via a first optical fiber 12, to a first optical coupler 14, of a type well known in the art. The first optical coupler 14 is designed to tap or sample only a relatively small portion of the laser's output power. Thus, for example, a 13 db coupler would divide the output beam into a sampled beam, of about 5 per cent of the laser's total output power that would be conducted, via a second optical fiber 16, into the stabilization and tuning apparatus to be described below. The remaining 95 per cent of the laser's output power is conducted, via a third optical fiber 18, to the sensor system or the like (not shown) employing the laser 10 as a light source.

The sampled beam is then fed into a second optical coupler 20, which is a 3 db coupler that divides the sampled beam into two beams of approximately equal power. Each of these two beams is then fed (via one of a pair of optical fibers 22a, 22b) into one of a pair of rod-shaped graded index lenses ("GRIN lenses") 24a, 24b. The GRIN lenses 24a, 24b are commercially available items, marketed by, for example, NSG America, Inc., Somerset, N.J., under the trademark "SELFOC". They function as collimating lenses that produce a pair of substantially parallel, collimated light beams. These two collimated beams are optically coupled, by the GRIN lenses 24a, 24b, as optical input signals to the input side of an interferometer 26.

Figure 2:
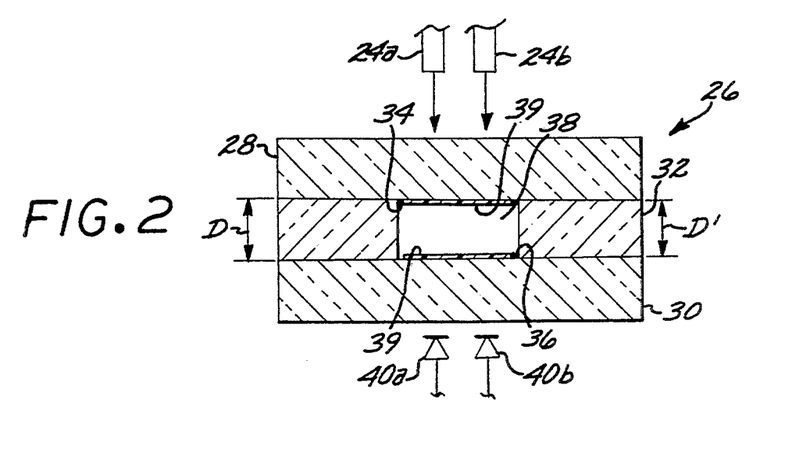
FIG. 2 is a simplified cross-sectional view of a wedged etalon, of the type used in the system of FIG. 1.

As shown in FIG. 2, the interferometer 26 is, essentially, a Fabry-Perot etalon, comprising a first, or entrance plate 28 and a second, or exit plate 30, fixed to opposite sides of a hollow centered spacer 32. The first plate 28, the second plate 30, and the spacer 32 are made of a suitable, optical quality material having a very low coefficient of thermal expansion. Examples of such material are the titanium silicate glass marketed by Corning, Inc., Corning, N.Y. under the trademark "CORNING ULE"; and the very low expansion glass/ceramic composition marketed by Schott Glasswerke, Mainz, Germany under the trademark "ZERODUR". Optimally, the material should not expand or contract by more than about 0.02 ppm per degree Celsius at ambient temperatures in the range of about 20° C. to about 25° C.

The entrance plate 28 has a first interior optical surface 34 that is spaced from an opposing second interior optical surface 36 on the exit plate 30. The space between the first optical surface 34 and the second optical surface 36, created by the spacer 32, defines a gap or cavity 38, through which the collimated beams described above propagate. The reflectivity of the optical surfaces 34, 36 is increased by applying an optical coating 39, comprising several alternating quarter wave layers of high and low refractive index materials to each surface. For example, a reflectivity of 75 per cent (0.75) can be achieved with three layers of titanium dioxide alternating with two layers of silicon dioxide on each surface. This will yield a fairly low finesse interferometer, with a finesse F of about 12, obtained by the equation:

$$F = \pi \sqrt{R} /(1 - R); \tag{1}$$

where R is the reflectivity.

The spacer 32 is formed so that, in cross-section (as shown in FIG. 2), it is shaped as a wedge defining an angle in the range of about 2 arc-seconds to about 2 arc-minutes (about $1.0 \times 10^{-5}$ to $6.0 \times 10^{-4}$ radians), depending on the cavity width and reflectivity. As shown in FIG. 2, the spacer 32 decreases from a thickness D on the left to a smaller thickness D' on the right. The wedge-shaped spacer 32 thus creates a cavity 38 that continuously decreases in width along one axis that is normal to the axis of propagation of the light beams through the cavity. In FIG. 2, if one defines the axis of propagation as the z-axis, then the cavity continuously tapers in width along the x-axis, decreasing from left to right in the drawing. The cavity width along the y-axis (defined as normal to the plane of the drawing) is constant. The function and purpose of this wedged cavity 38 will be explained below.

Coupled to the exterior of the exit plate 30 is a matched pair of photodetectors 40a, 40b, which may be conventional photodiodes. Each of the photodetectors 40a, 40b detects one of the two optical beams emerging from the interferometer 26, and it generates, in response, an electrical signal that is indicative of the amplitude or power of its associated emergent beam. Referring again to FIG. 1, the electrical output signals from the photodetectors 40a, 40b are fed into amplifiers 42a, 42b, respectively. The amplifiers 42a, 42b advantageously are provided with variable gains, for the purpose of tuning, as will be described below. The amplified electrical signals are then fed into a differencing circuit 44, such as a differential amplifier, which produces an error signal output that is integrated by an integration circuit 46, and then fed back as a servo signal to a control mechanism 48 for the laser 10.

With proper placement of the photodetectors 40a, 40b, the 3 db coupler 20 may be omitted in certain applications, with a single collimated beam being introduced into the etalon 26 by a single GRIN lens. Such an embodiment may employ a single split photodiode, with two discrete pixels, as the photodetector, each pixel receiving a portion of the beam propagated through a cavity portion of a different width. Other than the use of a wedged (rather than stepped) etalon and the use of the variable gain amplifiers 42a, 42b, the system resembles that disclosed in U.S. Pat. No. 5,167,444—Hall, the disclosure of which is incorporated herein by reference.

Figure 10:
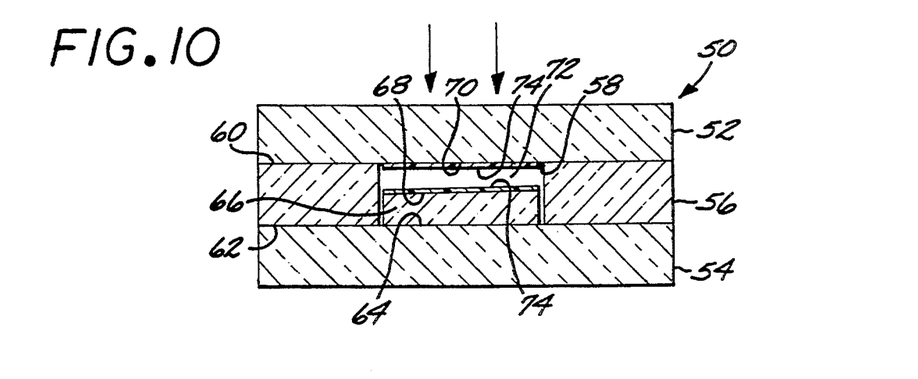
FIG. 10, is a simplified, cross-sectional view, similar to that of FIG. 2, showing an alternative embodiment of the wedged etalon used in the present invention.

The configuration of the etalon 26 described above and shown in FIG. 2 is suitable for cavities having a minimum width of about 0.5 mm. For narrower cavity widths, the alternative embodiment of FIG. 10 may be more easily fabricated. FIG. 10 shows an etalon 50 having an entrance plate 52 and exit plate 54 attached to opposite sides of a hollow-centered spacer 56 which defines an internal chamber 58. The spacer 56, however, unlike that of the FIG. 2 embodiment, is not wedged; its input side surface 60 and output side surface 62 are parallel.

Disposed within the chamber 58, and attached to the internal surface 64 of the exit plate 54, is an internal plate 66, formed from the same optical material as are the entrance plate 52 and the exit plate 54. The internal plate 66 has an exposed surface 68 that faces, and is spaced from, the internal surface 70 of the entrance plate 52, so as to define an optical cavity or gap 72 therebetween. The exposed surface 68 is inclined at a shallow angle (from left to right in the figure). The cavity 72 thereby defined between the inclined surface 68 and the internal surface 70 of the entrance plate 52 may thus be considered "wedge-shaped", continuously decreasing in width from left to right, as shown in the figure. Both the internal surface 70 of the entrance plate 52 and the inclined surface 68 of the internal plate 66 are treated with an optical coating 74, of the type described above with respect to the FIG. 2 embodiment.

OPERATION

The operation of the invention is now described in conjunction with the etalon embodiment of FIG. 2. The operational description would be equally applicable to the embodiment of FIG. 10.

Let us assume that the laser 10 has a nominal or desired wavelength $\lambda_o$. Let us also assume that two incident optical beams enter the interferometer cavity 38 along the z-axis, with the following normalized power functions:

$$P_{1in}(x,y) = \frac{A}{\pi w_o^2} \exp\left[\frac{-2}{w_o^2}((x-x_1)^2 + (y-y_1)^2)\right]; \quad (2)$$

and $$P_{2in}(x,y) = \frac{2-A}{\pi w_o^2} \exp\left[\frac{-2}{w_o^2}((x-x_2)^2 + (y-y_2)^2)\right]; \quad (3)$$

where $w_o$ is the 1/e squared beam power radius, and A is a normalization factor that varies between 0.00 and 2.00 (providing for beams of equal power when A=1.00). The integrated power of both beams over x and y is normalized to unity. Beam 1 is centered at $x_1$, $y_1$, and Beam 2 is centered at $x_2$, $y_2$.

Figure 3:
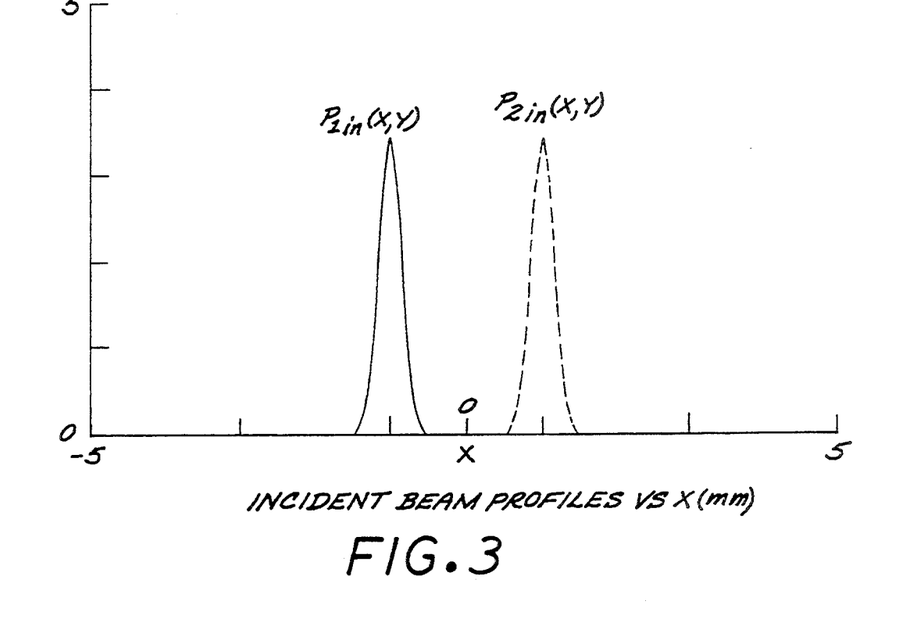
FIG. 3 is graph of incident beam power as a function of linear displacement in the etalon cavity on the x axis along which the cavity width decreases.

FIG. 3 is a graph showing a representative curve of incident beam power for balanced incident beams as a function of x, with beam 1 centered at $x_1 = -1$ mm and $y_1 = 0$; and beam 2 centered at $x_2 = 1$ mm and $y_2 = 0$.

The Fabry-Perot transmission factor T(x) for the cavity 38 at the nominal wavelength $\lambda_o$ is:

$$T(x) = \frac{(1-R)^2}{1 + R^2 - 2R\cos\left(\frac{4\pi g(x)}{\lambda_o}\right)}; \quad (4)$$

where g(x) is the cavity width as a function of x for a cavity that tapers in width along the x-axis. The equation for g(x) is:

$$g(x) = g_o + \alpha x \quad (5)$$

where $g_o$ is the width (in mm) at the center of the cavity 38 (x=0), and $\alpha$ is the wedge angle in radians. The cavity width $g_o$ at x=0 is selected to be an integral multiple of the nominal wavelength $\lambda_o$.

Figure 4:
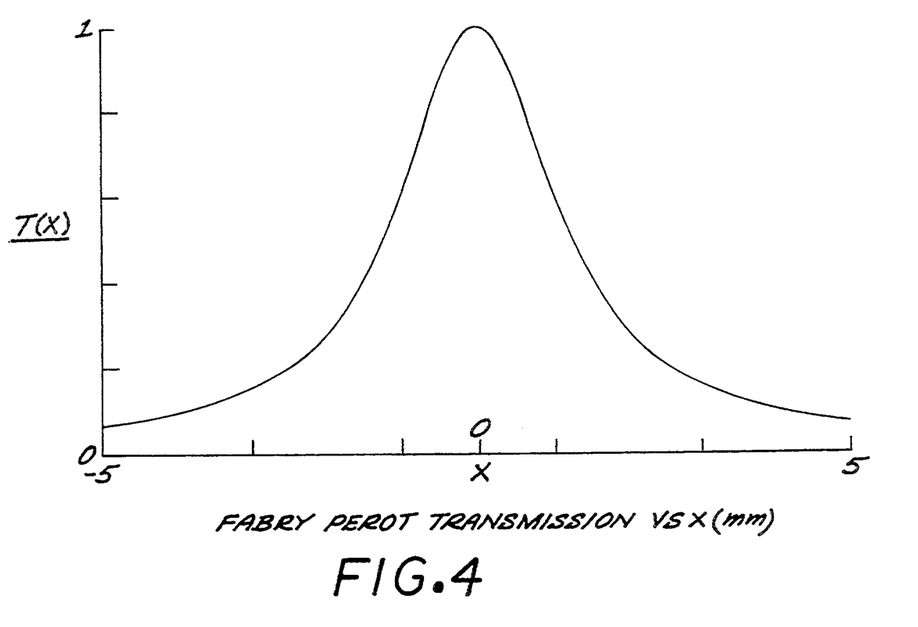
FIG. 4 is a graph of Fabry-Perot transmission through the etalon cavity, as a function of location on the x axis.

FIG. 4 is a graph showing a representative curve of the transmission factor T(x) as a function of x. Maximum transmission occurs at x=0, where the cavity width is $g_o$. A comparison of FIGS. 3 and 4 reveals that the incident beam centers coincide with the points on the x-axis at which the slope of the transmission factor curve is steepest.

The normalized power distributions for the two beams exiting the cavity 38 are:

$$P_{1out}(x,y) = T(x)P_{1in}(x,y) \quad (6); \text{ and}$$

$$P_{2out}(x,y) = T(x)P_{2in}(x,y) \quad (7)$$

Assuming that each of the photodetectors 40a, 40b has a diameter or width that is considerably larger than the diameter of the beam impinging upon it, the total power ($P_1$ and $P_2$, respectively) of each of the two beams impinging on the photodetectors 40a, 40b is given by:

$$P_1 = \int_{-\infty}^{\infty}\int_{-\infty}^{\infty} P_{1out}(x,y)dxdy; \quad (8)$$

and $$P_2 = \int_{-\infty}^{\infty}\int_{-\infty}^{\infty} P_{2out}(x,y)dxdy \quad (9)$$

The output powers $P_1$ and $P_2$ are functions of the wavelength by virtue of the transmission factor T(x) which is a function of wavelength (Equation 4), and which determines $P_{1out}$ and $P_{2out}$ (Equations 6 and 7). At the nominal wavelength $\lambda_o$, the values of $P_1$ and $P_2$ will be equal. Therefore, if the laser wavelength drifts from its nominal value, there will be a finite difference $\Delta P$ between the values of $P_1$ and $P_2$. By minimizing this difference (i.e., by driving $\Delta P$ toward zero), the laser wavelength can be driven toward the nominal wavelength.

It may be assumed, for example, that the actual wavelength $\lambda$ of the laser output beam at a given point in time can be expressed as the product of a fixed wavelength (i.e., the nominal wavelength $\lambda_o$) and a tunable scale factor that deviates from unity by the amount of a small deviation, expressed as $\epsilon$. This relationship can be expressed by the following equation:

$$\lambda = \lambda_o(1+\epsilon) \quad (10)$$

For a gap having a center width $g_o$ of 4.0001 mm, and a nominal wavelength $\lambda_o$ of 1300 nm, the transmission factor T(x) of Equation 4 above goes through one complete cycle when $\epsilon$ varies by $\lambda_o/2g_o$, which equals 162 ppm.

Figure 5:
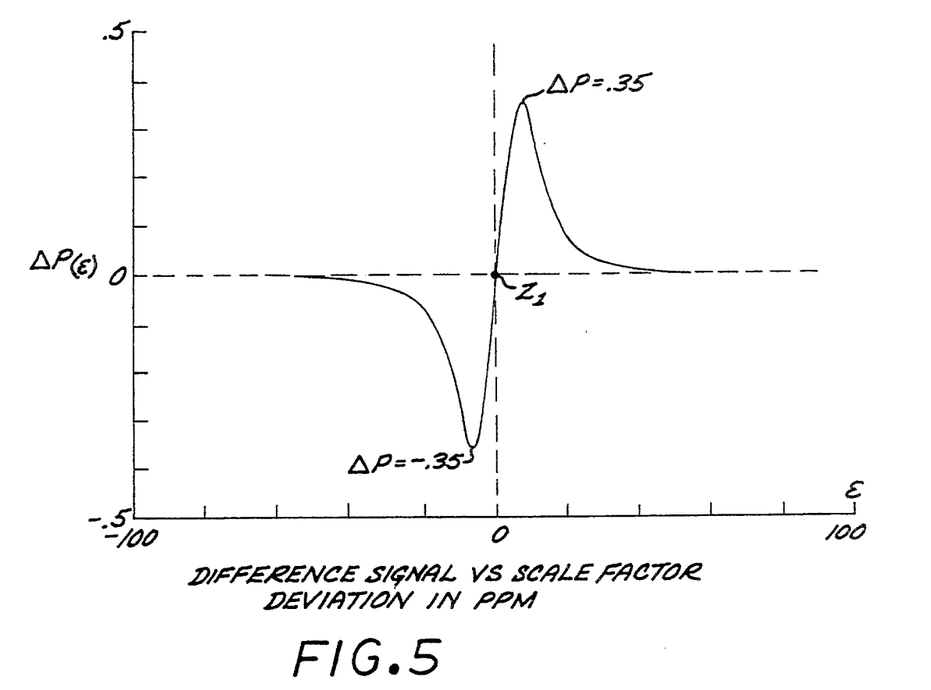
FIG. 5 is a graph of the difference signal outputted from the differential amplifier of the system of FIG. 1, as a function of scale factor deviation.
Figure 6:
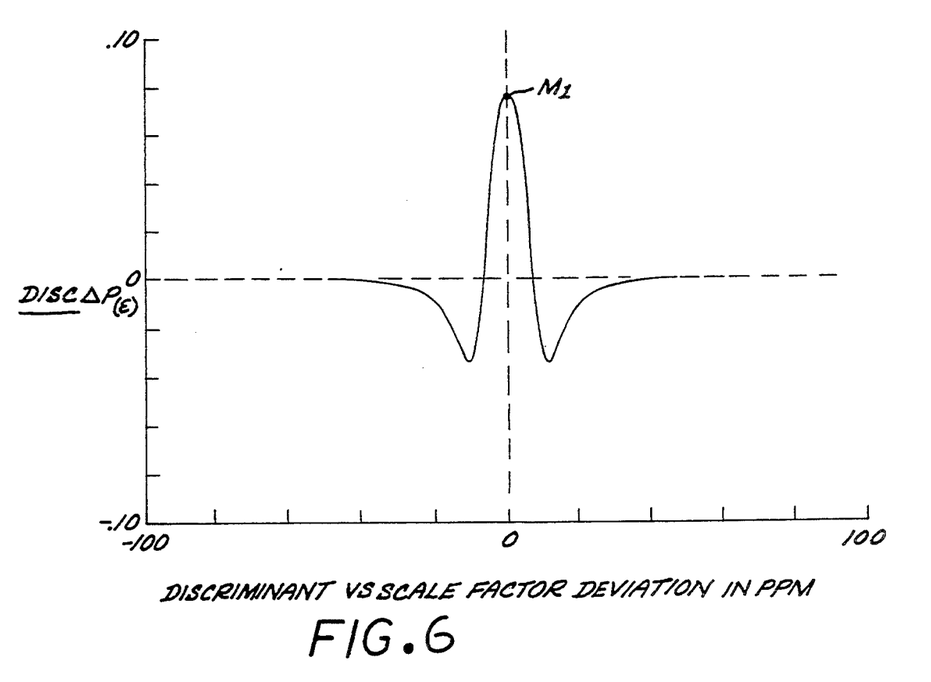
FIG. 6 is a graph of the first derivative of the difference signal (the "discriminant"), as a function of scale factor deviation.

FIG. 5 is a graph of $\Delta P$ as a function of the scale factor deviation $\epsilon$ for the incident beam profiles illustrated in FIG. 3, while FIG. 6 is a graph of the discriminant (first derivative) of the function illustrated in the graph of FIG. 5. Both figures are based on beam power in both incident beams normalized to one. FIG. 5 shows that $\Delta P$=zero at $\epsilon$=zero ppm (point $Z_1$), while FIG. 6 shows a maximum discriminant of 0.078 (7.8 per cent) per ppm at $\epsilon$=zero ppm (point $M_1$).

Figure 7:
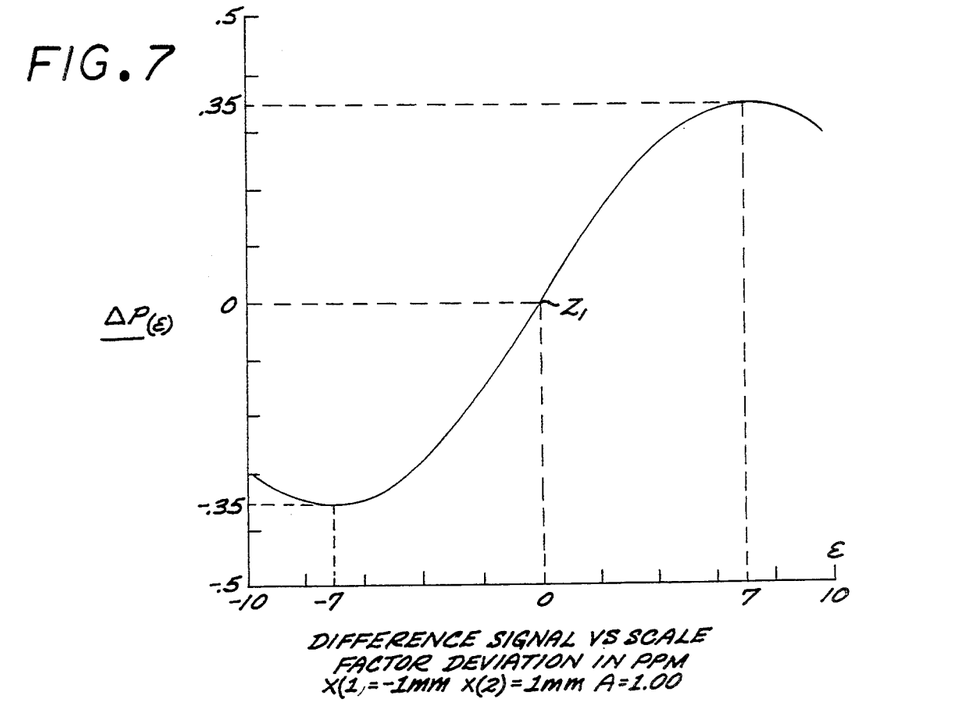
FIG. 7 is an enlarged view of the graph of FIG. 5, showing the region of the graph corresponding to values of scale factor deviation near zero.

Suppose that detection of the incident beams, before they enter the etalon 26, would produce an output voltage of one volt each (after a suitable transimpedance gain). Then, as shown in FIG. 5 (and more clearly in FIG. 7, which is an enlarged view of the central portion of FIG. 5, showing the region near $\epsilon$=0), $\Delta P$ can vary from $-350$ mV to 350 mV, corresponding to $\epsilon = -7$ ppm to $\epsilon = 7$ ppm, respectively. As best shown in FIGS. 6 and 7, to achieve a wavelength stability of $\pm 0.1$ ppm, a voltage difference within the range of $\pm 7.8$ mV needs to be maintained.

It is routine for those of ordinary skill in the pertinent arts to create a servo control system that meets the above-described specifications. For example, referring once again to FIG. 1, the laser controller mechanism 48 that receives the integrated difference or error signal outputted by the integrator 46 may (depending on the application and the type of laser used) vary the laser's operating temperature, drive current, output power, or a combination of two or more of these parameters, so as to drive the error signal amplitude to within the required range about zero.

The performance of the above-described system is a function of a number of parameters, including cavity width, wedge angle, etalon reflectivity, photodetector separation, incident beam diameter, and the ratio of the powers of the incident beams.

A starting point in designing the system might be, for example, to determine the maximum central cavity width for a given nominal wavelength and wedge angle. The Fabry-Perot transmission factor T(x) is valid under the following condition:

$$g_o \leq 0.375 \lambda_o / (n^3 \alpha^2) \qquad (11)$$

where n is the number of round trips that a light ray makes within the cavity. For a multiple beam interferometer, the contribution to the output beam power that the ray makes on the nth round trip is proportional to $R^n$. If we assume a reflectivity R of 0.75, a contribution of about 1.0 per cent is provided by the 16th round trip; the contributions of the 17th and higher round trips being disregarded as negligible. Thus, we may assume a value of n of 16. For a laser with a nominal wavelength $\lambda_o$ of 1300 nm, and for a wedge angle $\alpha$ of $2.42 \times 10^{-5}$ radians, the maximum central cavity width $g_o$ would be about 200 mm, which is well beyond the cavity widths contemplated for this system.

By way of specific example, for a laser with a nominal wavelength $\lambda_o$ of 1300 nm, and with incident beams emerging from the GRIN lenses 24a, 24b each having a beam radius $w_o$ of 0.300 mm, the degree of stability described above can be achieved with an etalon having a central cavity width $g_o$ of 4.0001 mm, a wedge angle $\alpha$ of $2.42 \times 10^{-5}$ radians, and a reflectivity R of 0.75 (assuming a properly designed servo system). Also, as mentioned above, the ratio of incident beam powers is 1, and photodetector separation is 2 mm (beam 1 being at $x_1 = -1$ mm, beam 2 being at $x_2 = 1$ mm). It is noted that twice the central cavity width $g_o$ (equal to the round trip distance traveled by a light ray in the cavity) is equal to an integral multiple (6144) of the nominal wavelength $\lambda_o$.

Figure 8:
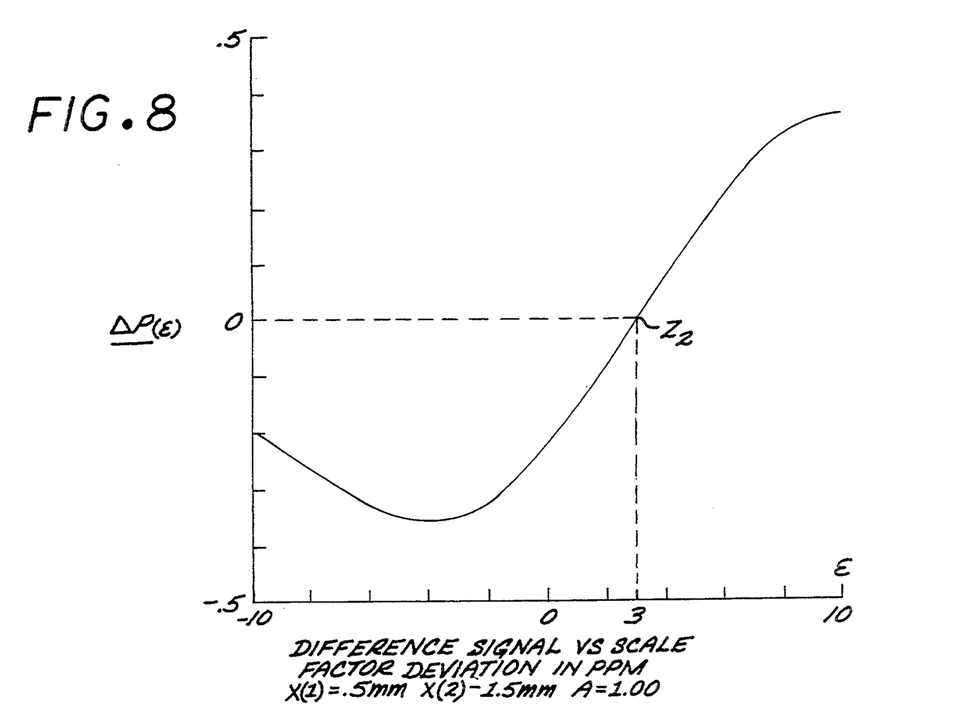
FIG. 8 is a graph similar to that of FIG. 7, but showing the effect of asymmetrical spacing of the incident beams relative to the center of the cavity.
Figure 9:
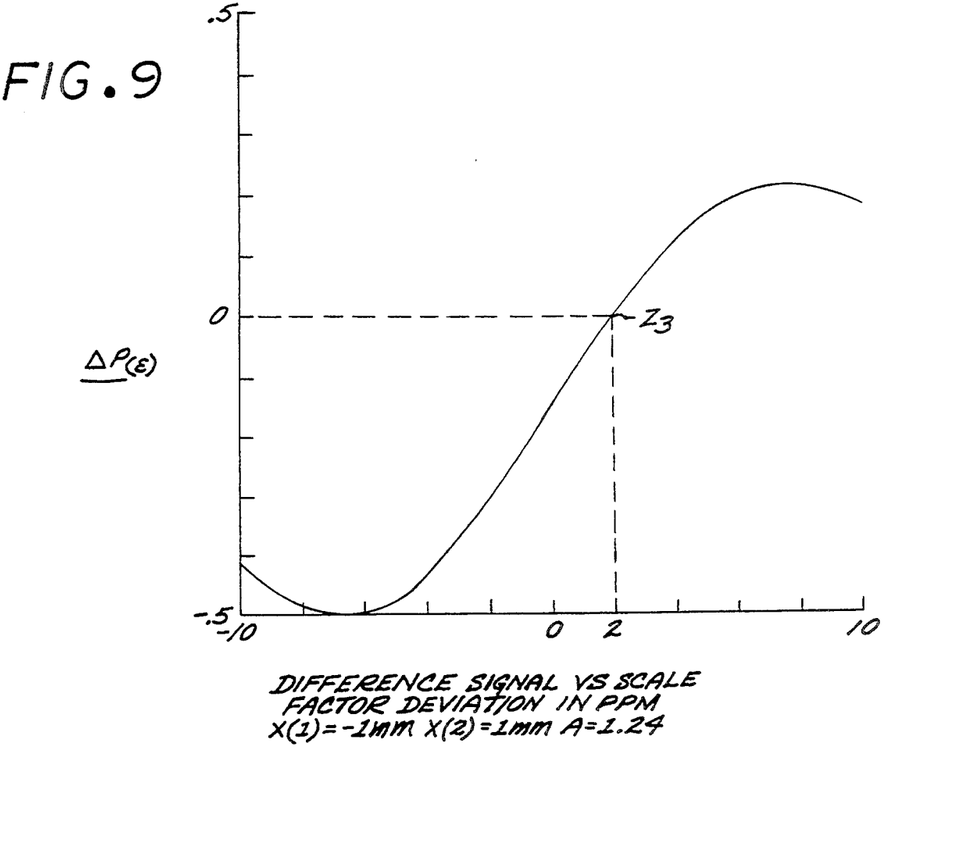
FIG. 9 is a graph similar to that of FIG. 7, but showing the effect of incident beams of unequal power.

For a given central cavity width and wedge angle, there are two major criteria that are useful in estimating the overall stabilization ability of the subject invention: (1) The sensitivity of the laser wavelength to detector misalignment; and (2) the sensitivity of the laser wavelength to the ratio of the powers of the two incident beams. FIGS. 7, 8, and 9 illustrate the effects of these criteria.

Specifically, FIG. 7, as discussed above, shows a curve of $\Delta P$ vs. scale factor deviation $\epsilon$ for a beam power ratio of 1, and for beams incident on photodetectors located at $x_1 = -1$ mm and $x_2 = 1$ mm, respectively. The value of $\Delta P$ is zero when $\epsilon$ is zero; that is, the $\Delta P$ zero crossing $Z_1$ is at (0,0).

In FIG. 8, the photodetector locations are shifted 0.5 mm to the right ($x_1 = -0.5$ mm; $x_2 = 1.5$ mm). The $\Delta P$ zero crossing is at the point $Z_2$ at which $\epsilon = 3$ ppm; that is, at the point (3,0). Therefore, to maintain a 0.1 ppm stability for the laser wavelength, a lateral positional stability for the photodetectors of about 0.015 mm must be maintained. With suitably rigid mounting of the GRIN lenses 24a, 24b and of the photodetectors 40a, 40b, this degree of positional stability car be easily met if the ambient temperature is kept within a range of about $\pm 5$ degrees C.

In FIG. 9, the ratio of the beam powers is changed from 1.00 to 1.63 (i.e., the normalization factor A in Equations 2 and 3 is equal to 1.24). The $\Delta P$ zero crossing is at the point $Z_3$ at which $\epsilon = 2$ ppm; that is, at the point (2,0). Maintaining a 0.1 ppm wavelength stability therefore means that the beam power ratio can vary no more than about 2.4% from the baseline value of 100% ($\pm 0.024$ from a unity-normalized baseline value). The incident beam power ratio is determined by the second optical coupler 20, and the ratio will be unity for a precisely 3 db coupler. Optical couplers with the required degree of precision, over fairly large temperature ranges, are commercially available.

As mentioned above, the amplifiers 42a, 42b that amplify the electrical output signals from the photodetectors 40a, 40b, respectively, advantageously are provided with variable gains. This feature allows the nominal wavelength $\lambda_o$ to be selectively changed or tuned to another selected wavelength.

As can be appreciated from the above discussion of FIG. 9, if the ratio of the beam powers is varied, the wavelength at which A P is zeroed is likewise varied. Similarly, if the incident beam power ratio is maintained constant (at or near unity), the ratio of the amplitudes of the photodetector output signals can be changed to achieve a similar shift in the wavelength at which $\Delta P$ is zeroed. The photodetector output signal amplitude ratio can be selectively adjusted by selectively adjusting the gain ratio of the two amplifiers 42a, 42b. For example, referring again to FIG. 9, changing the gain ration from 1.00 to 1.63 generates a 2 ppm change in wavelength. If the original wavelength is 1300 nm, this amounts to a shift of 462 MHz from the baseline point determined by the incident beam power ratio of 1.00 and the center cavity width of 4.0001 mm.

The tuning range of the system is inversely proportional to cavity width: reducing the cavity width extends the tuning range. On the other hand, the degree of stability is directly proportional to cavity width. Thus, the tuning range can be extended only at the expense of stability. For example, a reduction of center cavity width by a factor of 100 (from approximately 4.0 mm to 0.04 mm) increases the tuning range by a factor of 100, and reduces the stability by the same factor. Thus, a system with a tuning range of 2 ppm and a stability of 0.1 ppm would become a system with a tuning range of 200 ppm and a stability of 10 ppm. Accordingly, a system can be designed that optimizes either tuning range or stability, or that achieves, by compromise, a satisfactory performance in both respects.

Furthermore, the present invention can be used to stabilize and/or tune more than one laser simultaneously, conceivably up to 100 or more lasers, with fixed wavelength spacing being maintained among the multiple laser sources. Each laser source is optically coupled to the etalon with a pair of GRIN lenses, and for each laser source there is a pair of photodetectors to receive the optical output signals from the etalon and to generate the electrical output signals that are then fed into a differencing circuit to generate an error signal. Each error signal is integrated and then used as a servo signal to control its associated laser, in the manner described above, to stabilize the laser wavelength. Tuning of the individual lasers can be provided by adjustable amplifier gains, as previously described. To the extent that the etalon will expand or contract with varying temperature (which can be minimized by the proper selection of materials, as discussed above), all of the laser wavelengths will drift together, making the wavelength separation of channels independent of temperature.

Moreover, the etalon 26 of FIG. 2 can be used as a multi-channel laser receiver, with up to 10 fiber optic inputs, each coupled, via a GRIN lens, to the entrance plate 28. In such an application, the spacer 32 is slightly wedged, at an angle of about 5 to 10 arc-seconds ($2.5-5.0 \times 10^{-5}$ radians). The mirror coatings 39 are made to yield a finesse of about 100, on the assumption that the number of channels that can be accommodated is approximately equal to one-tenth the finesse value. There is one photodetector for each GRIN lens input. In this configuration, the etalon 26 acts as a frequency-selective, optical band pass filter, with a unique pass band for each GRIN lens/photodetector pair. Thus, a multi-wavelength (multiplexed) optical beam can be introduced into the etalon via the GRIN lenses, and separated (demultiplexed) into its component wavelengths, each of which is detected by a unique photodetector, which then generates an electrical signal representative of the optical signal detected by that photodector.

It should be evident that the modified etalon 50 of FIG. 10 can likewise be adapted for use as a multi-channel optical receiver.

By way of a specific example, an etalon with a central cavity width of 0.5 mm and a wedge angle of 8 arc-seconds ($4.0 \times 10^{-5}$ radians), a free spectral range of 300 GHz can be obtained, with inter-channel spacing of 30 GHz (150 ppm of an optical center wavelength of 1550 nm) for 10 channels. In this configuration, a lateral displacement along the axis of decreasing cavity width (the x-axis) produces a 30 GHz shift in the pass band of the etalon, corresponding to one inter-channel spacing. Thus, ten GRIN lens inputs, with ten corresponding photodetectors, with spacing of 2 mm on center, would provide a 10 channel receiver.

When the subject invention is used to stabilize and/or tune multiple laser sources, the number of laser sources that can be controlled depends on the lateral dimensions of the optically active part of the etalon cavity. Likewise, if the above-described etalon is used as a multi-channel optical receiver, the number of channels that can be received is similarly limited. If the GRIN lenses and photodetectors are arranged only along the x-axis, as described above, the number of laser sources will be limited by the diameter of the cavity. To increase the number of lasers that can be controlled, the GRIN lenses and photodetectors can be arranged in an x-y array. Two such arrays, in conjunction with an etalon configured as a multi-channel receiver, are shown in FIGS. 11, 12, 13, and 14.

Figure 11:
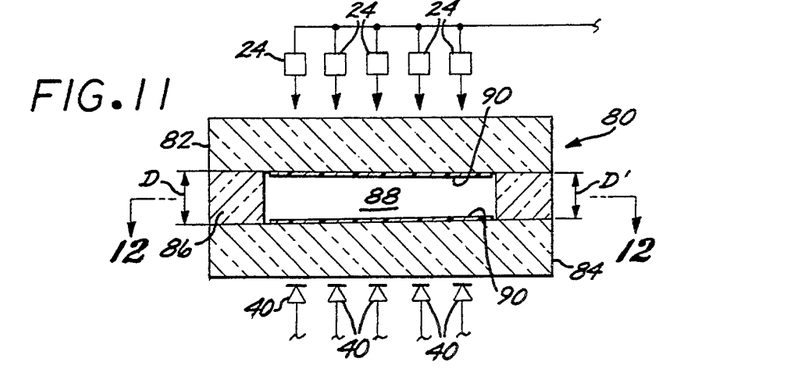
FIG. 11 is a semi-schematic view of a multi-channel optical receiver, using a wedged etalon in accordance with the present invention, the etalon being shown simplified and in cross-section, as in FIG. 2.
Figure 12:
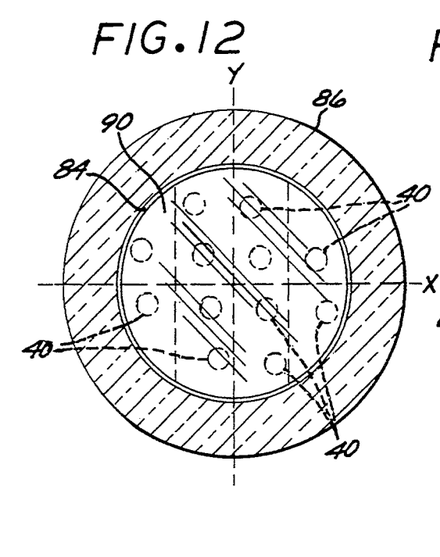
FIG. 12 is a cross-sectional view, taken along line 12—12 of FIG. 11, showing the exit plate of the etalon configured for an x-y array of photodetectors.

Referring to FIG. 11 and 12, an etalon 80 is adapted for an x-y array of GRIN lenses and photodetectors by arranging both the GRIN lenses 24 and the photodiodes 40 in staggered rows. The etalon 80 is, in all material respects, similar to the etalon 26 of FIG. 2, having an entrance plate 82 and an exit plate 84 attached to opposite sides of a hollow-centered wedged spacer 86, so as to define a cavity 88 that continuously decreases in width along the x-axis from a width D on the left side of FIG. 11 to a lesser width D' on the right. The opposed internal surfaces of the entrance plate 82 and the exit plate 84 are provided with an optically-reflective coating 90, as previously described.

In the multi-channel optical receiver configuration, a multiple-wavelength optical beam is coupled to the input side of the entrance plate 82 through a plurality of GRIN lenses 24, each of which is associated with a unique photodetector 40 at the output side of the exit plate 84. As shown in FIG. 12, the photodetectors 40 are arranged in a planar x-y array comprising a plurality of staggered rows; the GRIN lenses 24 (not shown in FIG. 12) are arranged in a corresponding array. The placement of each GRIN lens/photodetector pair is such that each pair is located at a different cavity width. In this manner, many more such pairs can be employed, as compared with a linear array solely along the x-axis.

Figure 13:
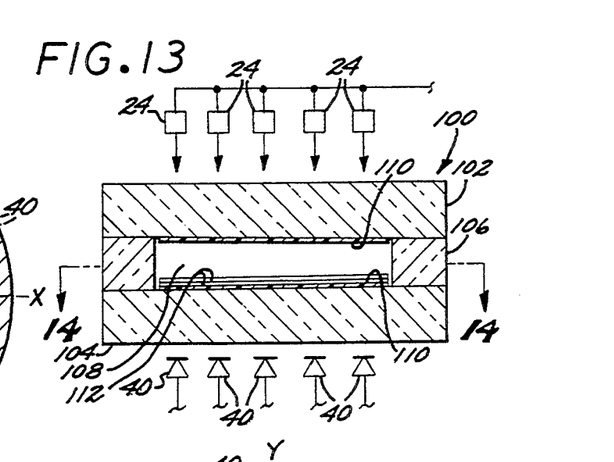
FIG. 13 is a cross-sectional view, similar to that of FIG. 12, showing an alternative embodiment of the exit plate configured for an x-y array of photodetectors.
Figure 14:
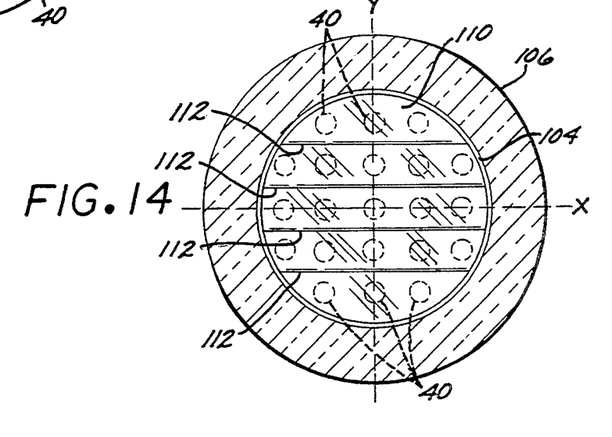
FIG. 14 is a cross-sectional view taken along line 14—14 of FIG. 13.

An alternative configuration is shown in FIGS. 13 and 14. As shown, an etalon 100 comprises an entrance plate 102, an exit plate 104, and a hollow-centered wedged spacer 106, thereby defining a cavity 108 that continuously decreases in width along the x-axis (from left to right in the Figure). A reflective coating 110 is applied to the opposed interior surfaces of the entrance plate 102 and the exit plate 104, as previously described. The multi-wavelength optical beam is coupled to the input side of the entrance plate 102 by a plurality of GRIN lenses 24, each of which is associated with a different photodetector 40 at the output side of the exit plate 104.

As best shown in FIG. 14, the internal optical surface of the exit plate 104 is formed in a stepped configuration, with a plurality of steps 112 going upwardly (i.e., toward the entrance plate 102) along the y-axis. As oriented in FIG. 14, the steps 112 go upwardly (thereby step-wise decreasing the cavity width) from the bottom of the Figure toward the top. Thus, the cavity width decreases in width continuously along the x-axis due to the wedged spacer 106, while it decreases discontinuously (step-wise) along the y-axis due to the steps 112. The steps 112 can be formed in accordance with the teachings of U.S. Pat. No. 5,167,444, the disclosure of which has been incorporated herein by reference.

Because the cavity width decreases in each of two dimensions (i.e., along the x-axis and along the y-axis), each location in the cavity has a different and unique width (as long as no two locations on the same step share the same x-coordinate). Each such location can accommodate a unique GRIN lens/photodetector pair (only the photodetectors 40 being shown in FIG. 14). Therefore, a much larger number of GRIN lens/photodetector pairs can be employed, each with its own unique cavity width, than can be employed in a purely linear array along the x-axis.

The x-y arrays of GRIN lenses and photodetectors employed in the embodiments of FIGS. 11, 12, 13, and 14 can be used in the wavelength stabilization/tuning application, as well as in the multi-channel optical receiver application described above. Thus it can be seen that with the embodiments of FIGS. 11, 12, 13, and 14, a large number of lasers (up to 100 or more) can be stabilized and/or tuned. When the invention is employed as a multi-channel optical receiver, ten or more channels can be utilized, assuming a suitable finesse (i.e., on the order of about 100 or more).

In any of the above-described embodiments, whether used in laser stabilization/tuning systems, or in multi-channel optical receiver systems, it may be possible or advantageous, in some applications (e.g., where cost savings are desired), to substitute conventional optical lenses for the GRIN lenses to achieve a collimated incident beam. For example, the incident beam may be coupled, via an optical fiber, to a diverging concave lens, from which the diverging beam would pass through a converging convex lens to achieve collimation prior to entry into the etalon. The result would be a single collimated incident beam, having a beam width sufficient to produce output signals from all of the photodiodes. Further cost savings can be attained by eliminating the diverging concave lens, but this would require a greater distance between the end of the optical fiber and the converging convex lens.

While a number of preferred and alternative embodiments of the invention have been disclosed herein, as well as several modifications and variations, it will be appreciated that further variations and modifications will suggest themselves to those skilled in the pertinent arts. Such variations and modifications should be considered to be within the spirit and scope of the invention, as defined in the claims that follow.

What is claimed is:

1. Apparatus for stabilizing the wavelength of an optical output signal from an optical signal source, comprising:
   lens means for collimating the optical output signal into a collimated incident beam;
   an interferometer disposed to receive the incident beam, the interferometer including a Fabry-Perot cavity that continuously decreases in width along at least one axis normal to the axis of propagation of the incident beam, whereby the width of the cavity traversed by a first portion of the incident beam is greater than the width of the cavity traversed by a second portion of the incident beam, the interferometer transmitting first and second optical signals respectively corresponding to the first and second beam portions;
   photodetection means for detecting the first and second optical signals and for generating corresponding first and second electrical signals; and
   feedback means, responsive to the first and second electrical signals and operative on the optical signal source, for adjusting the wavelength of the optical output signal so as to minimize the difference in amplitude between the first and second electrical signals.

2. The apparatus of claim 1, further comprising:
   tuning means for selectively adjusting the wavelength of the optical output signal that minimizes the amplitude of the error signal.

3. The apparatus of claim 2, wherein the tuning means comprises means for selectively varying the ratio of the amplitudes of the first and second electrical signals.

4. The apparatus of claim 1, wherein the lens means includes a graded index lens.

5. The apparatus of claim 1, further comprising beam splitting means for splitting the optical output signal into first and second beams, and wherein the lens means collimates the first and second beams into first and second substantially parallel collimated incident beams.

6. The apparatus of claim 5, wherein the beam splitting means comprises an optical coupler that splits the optical output signal into first and second beams of approximately equal optical power.

7. The apparatus of claim 5, wherein the lens means comprises first and second graded index lenses that respectively collimate the first and second beams.

8. The apparatus of claim 5, wherein the interferometer receives the first and second incident beams, wherein the first portion of the incident beam comprises the first incident beam, and wherein the second portion of the incident beam comprises the second incident beam.

9. The apparatus of claim 1, wherein the Fabry-Perot cavity decreases continuously in width along a first axis normal to the axis of propagation of the incident beam, and decreases discontinuously step-wise in width along a second axis normal to the first axis and to the axis of propagation of the incident beam.

10. The apparatus of claim 1, wherein the feedback means comprises:
    differencing circuit means, responsive to the first and second electrical signals, for generating an error signal having an amplitude proportional to the difference in amplitudes of the first and second electrical signals; and
    control means, responsive to the error signal, for adjusting the wavelength of the optical output signal so as to minimize the amplitude of the error signal.

11. A method for stabilizing the wavelength of an optical output signal from an optical signal source, comprising the steps of:
    (a) collimating the optical output signal into a substantially collimated incident beam;
    (b) providing an interferometer having a Fabry-Perot cavity that continuously decreases in width along at least one axis normal to the axis of propagation of the incident beam;
    (c) introducing the incident beam into the interferometer so that the cavity width traversed by a first portion of the incident beam is greater than the cavity width traversed by a second portion of the incident beam;
    (d) detecting first and second optical signals transmitted from the interferometer that respectively correspond to the first and second portions of the incident beam;
    (e) generating first and second electrical signals respectively in response to the first and second optical signals;
    (f) comparing the amplitudes of the first and second electrical signals and generating an error signal proportional to the amplitude difference; and
    (g) adjusting the wavelength of the optical output signal in response to the error signal so as to minimize the amplitude of the error signal.

12. The method of claim 11, further comprising the step of:
    (h) selectively adjusting the wavelength of the optical output signal that minimizes the amplitude of the error signal.

13. The method of claim 12, wherein the step of selectively adjusting the wavelength comprises the step of selectively varying the ratio of the amplitudes of the first and second electrical signals.

14. The method of claim 11, wherein the step of collimating comprises the steps of:
   (a.1) splitting the optical output signal into first and second beams; and
   (a.2) collimating the first and second beams into first and second substantially parallel collimated incident beams.

15. The method of claim 14, wherein the first portion of the incident beam comprises the first incident beam, and wherein the second portion of the incident beam comprises the second incident beam.

16. Apparatus for receiving a multi-wavelength optical signal and for generating a plurality of electrical signals, each of which represents one of the wavelengths contained in the multi-wavelength optical signal, the apparatus comprising:
   lens means for collimating the multi-wavelength optical signal into a collimated incident beam;
   an interferometer having an entrance plate disposed to receive the incident beam from the lens means, an exit plate, and a Fabry-Perot cavity defined between the entrance plate and the exit plate, wherein the cavity continuously decreases in width along at least one axis normal to the axis of propagation of the incident beam, whereby each of a plurality of single wavelength optical signals is emitted from the exit plate at a location associated with a different cavity width; and
   a plurality of photodetectors adjacent the exit plate, each of which is located so as to receive only one of the plurality of single wavelength optical signals, and each of which generates an electrical signal representative of its received single frequency optical signal.

17. The apparatus of claim 16, wherein the lens means provides a plurality of collimated incident beams, each of which is operatively associated with one of the plurality of photodetectors.

18. The apparatus of claim 17, wherein the lens means comprises a plurality of GRIN lenses, each of which is operatively associated with one of the plurality of photodetectors.

19. The apparatus of claim 16, wherein the photodetectors are arranged in an array in a plane defined by a first axis normal to the axis of propagation of the incident beam and a second axis normal to the first axis and to the axis of propagation of the incident beam.

20. The apparatus of claim 19, wherein the Fabry-Perot cavity decreases continuously in width along the first axis, and decreases discontinuously step-wise in width along the second axis.

* * * * *